United States Patent [19]
Booth et al.

[11] Patent Number: 4,713,202
[45] Date of Patent: Dec. 15, 1987

[54] PROCESS FOR REDUCING THE DISTORTION OF MULTI-LAYERED LAMINATES

[75] Inventors: Llewellyn D. Booth, Lake Jackson, Tex.; Arie Cohen, Midland, Mich.

[73] Assignee: The Dow Chemical Company, Midland, Mich.

[21] Appl. No.: 730,523

[22] Filed: May 6, 1985

[51] Int. Cl.$^4$ .................. B29C 35/16; B29C 71/00; B29C 67/20
[52] U.S. Cl. .................. 264/46.5; 264/46.6; 264/46.7; 264/237; 264/348
[58] Field of Search .............. 264/321, 237, 346, 348, 264/46.5, 46.6, 48, 46.7; 428/913, 319.1

[56] References Cited
U.S. PATENT DOCUMENTS 3,099,516 7/1963 Henrickson .................. 264/48
3,452,133 6/1969 Bratton et al. .................. 264/346

Primary Examiner—Jan H. Silbaugh
Assistant Examiner—J. Durkin

[57] ABSTRACT

A process for preparing a multilayer structure. The structure is produced at an elevated temperature. The structure is characterized in that it distorts upon changes in temperature; includes at least two layers of different materials, at least one of which creeps significantly at the elevated temperature at which the structure is prepared and; contains no layers which creep significantly at ambient temperature. The process includes cooling said structure such that at least one of the layer(s) which creeps at said elevated temperature is cooled at a rate which is least 50% less than the material cooling rate thereof.

9 Claims, No Drawings

PROCESS FOR REDUCING THE DISTORTION OF MULTI-LAYERED LAMINATES

BACKGROUND OF THE INVENTION

This invention relates to a process for reducing the distortion of multi-layered composite structures, particularly such structures which distort upon changes in temperature, at least one layer of which exhibits substantial creep under stress at an elevated temperature.

Composite structures in which plastics are laminated to other plastics or to metals are in common usage in a variety of applications. These structures have found such widespread usage mainly because they possess a combination of properties which can not be found in any single material. Many of these materials suffer from the significant disadvantage that they tend to distort when subjected to temperature changes. This behavior is similar to that of a bimetallic laminate such as used in thermostats. Since the composite structure is generally formed at an elevated temperature and thereafter cooled, it is quite often distorted when it reaches the temperature at which it will be used.

This distortion causes dimensional changes in the composite structure which are particularly severe if the area of the structure is large. In severe cases, this distortion can cause the layers to delaminate. The distortion also makes it difficult to fit the structure to other parts in preparing an assembly. The distortion and build-up of stresses in the composite can also lead to cracking and general weakness in the structure.

This problem is of particular significance in appliance industry, particularly the refrigerator and freezer industry. The walls of refrigerators and freezers commonly comprise an innermost layer of a thermoplastic resin, a central layer of a polyurethane insulating foam and an outer layer of steel or other metal. These walls are generally prepared by forming an empty shell of the inner and outer layers, and forming the polyurethane in place. The heat of reaction in the polyurethane foams heats the entire wall, which then distorts on cooling. The distortion in the walls varies its dimensions making it difficult to mount shelves and other accessories. Furthermore, cracking in corners of the inner wall leads to a high rate of rejection of the walls.

Due to the aforedescribed problems associated with distortion of composite structures, it would be desirable to provide a process whereby said distortion is reduced.

SUMMARY OF THE INVENTION

The present invention is an improvement in a process for preparing a multilayer structure, wherein the structure is produced at an elevated temperature. The structure is characterized in that it (1) distorts upon changes in temperature, (2) comprises at least two layers of different materials, at least one of which creeps significantly at the elevated temperature at which the structure is prepared and, (3) contains no layers which creep significantly at ambient temperature. The improvement which is this invention comprises cooling said structure such that at least one of the layer(s) which creeps at said elevated temperature is cooled to a temperature at which it does significantly creep at a rate which is at least 50% less than the natural cooling rate thereof.

In essence, applicants have found that the distortion of a composite structure is dependent to a large extent on its thermal history. By subjecting the structure to a cooling pattern as described herein, one or more of the layers creeps with respect to the other layers in the structure, thereby reducing or eliminating the distortion in the cooled structure.

DETAILED DESCRIPTION OF THE INVENTION

The composite structure produced according to this invention is one which tends to distort upon changes in temperature. This distortion is typically due to differences in thermal and elastic properties of the materials from which the various layers are made, and is similar to the "bimetallic" effect commonly seen in bimetallic strips. This tendency to distort is reduced according to the improved process of this invention.

The composite structure is comprised of at least two securely bonded layers which are of different materials. By "securely bonded" it is meant that the layers are bonded such that they cannot move with respect to each other at the interface of the layers. Of these layers, at least one creeps significantly at an elevated temperature at which the composite structure is produced. In addition, none of the layers in the composite structure creeps significantly at ambient temperatures.

By "creeps significantly", it is meant that the material described undergoes a measurable change in length due to creep in response to an applied stress at the designated temperature in a relatively short period of time. In this invention, a material which exhibits a change in length (% elongation) due to creep of about 0.2% or more, preferably about 0.4% or more in a period of about 1 day or less at the specified temperature is considered to creep significantly. More generally, any material which creeps sufficiently to reduce distortion at the composite structure by at least about 10% under the conditions of the cooling step of this invention, as compared with the distortion obtained with conventional processes, is considered to creep significantly.

In this invention, "ambient" temperature refers to the temperature or range of temperatures at which the composite structure is employed. The ambient temperature is one which may be, but is not necessarily, ordinary room temperature (i.e. about 20° to 25° C.). The term "elevated" temperature refers to a temperature which is higher than the ambient temperature, at which the first layer exhibits significant creep.

Materials which exhibit significant creep is described herein include metals such as iron, nickel, cobalt, silver, gold, platinum, copper, titanium, alloys thereof and the like and thermoplastics such as polyethylene, polypropylene, polybutylene, polybutadiene, polystyrene, polyacrylonitrile, styrene/acrylonitrile resins, polycarbonates, polyesters, cellulose esters, the so-called ABS resins, thermoplastic polyurethanes, polyvinyl chlorides, polyvinylidene chlorides, acrylic resins as well as blends, interpolymers, block copolymers, graft copolymers and other polymers of the aforementioned or similar materials.

Only one layer of the composite necessarily creeps significantly at the elevated temperature as described herein. The material(s) which comprise the other layer(s) may also exhibit similar creep properties, but these properties are not required. The other layers may be comprised of those materials mentioned in the preceeding paragraph as well as thermosetting resins such as epoxy resins, polyurethanes, and crosslinked addition polymers, as well as non-polymeric materials such as wood or glass. If more than two layers are present in the composite they may be of any desirable material, and may, but do not necessarily creep significantly at the elevated temperature. Such additional layers also do not creep significantly at ambient temperature.

In the process of this invention, the composite is formed in a process by which the layers therein are bonded together at an elevated temperature. The present invention is useful in any such process. For example, a process wherein one of the layers is extruded onto the remaining layers is suitable. Additionally, a process wherein a monomer, monomer mixture or other polymer precursor is contacted with one or more of the layers in the laminate and cured in place is also suitable. A so-called coextrusion process whereby a plurality of microlayers of thermoplastics are extruded to form a multilayer composite is useful herein. Processes whereby a hot melt adhesive or a heat or radiation curable adhesive is used to bind the layers of the composite are suitable. In addition, processes whereby a latex is dewatered, coagulated and cured to form one or more layers of the composite are useful herein. Other processes to which the present invention is amenable will be readily apparent to the skilled artisans.

In such processes, the temperature of each layer in the composite reaches an elevated temperature as described hereinbefore.

The particular temperature employed depends on the materials employed in the layers of the composite. When all the layers are metals, a temperature of about 100° to 1000° C. are typically suitable. When one of the layers is a thermoplastic polymer, a temperature from about 40 to 200, preferably from about 50 to 150 and more preferably about 50° to 100° C. are suitable. It is understood however, that these temperature ranges are intended as guidelines only and the creep properties and melting/decomposition temperatures of the materials in said various layers will determine the appropriate temperature in actual practice.

The composite structure which is formed at the elevated temperature is cooled to a temperature at which the layers do not significantly creep. The rate of cooling is critical to the process of this invention. Said component is cooled at a rate such that at least one of the layers which creeps at said elevated temperature is cooled to a temperature at which it does not significantly creep at a rate which is at least 50% less than the natural cooling rate thereof. In principal, an infinitely long cooling regime is best. However, economic factors require a somewhat short period of cooling. In general, the structure is cooled at a rate such that the time during which at least one layer is at a temperature at which it significantly creeps is extended, relative to the time provided by natural cooling, by about 15 minutes to 5 hours. Preferably, the rate of cooling is at least 70% less, more preferably at least 75% less than the natural cooling rate thereof. By "natural cooling rate" of the layer it is meant the cooling rate of the layer which is achieved by placing the heated composite in air at room temperature (20°-25° C.) with negligible air speed. Note that in determining the rate of cooling, only the rate of cooling in the range at temperatures at which a layer of the composite creeps is significant. Cooling below the temperature at which the layer creeps significantly is conducted at any desirable rate.

Although it is not intended to limit the invention to any theory, it is believed that by prolonging the cooling of the composite in this manner, stresses formed by the unequal contraction of said first and second layer cause at least one layer to creep with respect to the others. Gradual cooling as prescribed herein permits that layer more time to creep before it is cooled to a temperature at which its rate of creep is insignificant. The longer period at a temperature at which creep is significant enables the layer to better dissipate said stresses and therefore reduce distortion in the cooled composite.

The desired rate of cooling of the composite is readily achieved using any conventional means for retarding the rate of cooling of an object. The simplest and often the most economical method is simply to insulate the composite in order to retard its rate of cooling. Similarly, placing the composite in a temperature controlled environment in which the temperature is gradually reduced is also suitable.

It is only necessary to retard the rate of cooling of one layer of the composite which exhibits significant creep at an elevated temperature as described herein. The remaining layers may be cooled at any desirable rate, which may be the same or slower, or faster than the natural cooling rate thereof. In a preferred embodiment, the rate of cooling of at least one layer in the composite is greater than the natural cooling rate thereof. Preferably, such layer has a greater coefficient of thermal expansion and a higher elastic modulus than the layer(s) whose rate of cooling is retarded. It is believed that by accelerating the rate of cooling of one layer, while retarding the rate of cooling of at least one layer which creeps at an elevated temperature, greater forces are created within the composite which increase the creep of the layer(s), thereby further reducing the distortion of the composite.

The optional accelerated cooling of at least one layer is easily achieved using any conventional means for accelerating the rate of cooling of an object. The use of a fan or blower is often suitable, as well as placing the second layer in contact with a cooled environment.

In a particularly preferred embodiment of this invention, the composite is a three-layer composite comprising a thermoplastic or metal outer layer, a polymer foam intermediate layer and an inner layer of a thermoplastic resin. Refrigerators, freezers, coolers, ice chests and other insulated articles often have walls of such construction. In preparing such articles it is conventional to prepare all sides except the opening or door as a single unit by forming a "shell" enclosing an empty space between the inner and outer layers and then filling the empty space within said shell with a reactive polymer-forming mixture. The reactive mixture reacts to form a foam which fills the enclosed space between the inner and outer layers. The heat of reaction typically will heat all of the layers to about 50° to 80° C. Conventionally, this filled shell is allowed to cool at ambient conditions. According to this invention, the cooling of at least the inner thermoplastic layer is retarded, and preferably the cooling of the outer layer is accelerated. The desired retarded cooling rate of the thermoplastic layer is readily achieved simply by placing and closing the door of the insulated article or by leaving the metal jig used in constructing the panel in place to act as a heat sink. In this manner, the temperature inside the refrigerator or freezer is slowly reduced as required in this invention. Preferably, a fan, blower or other suitable means is used to accelerate the cooling of the outer steel layer.

The following examples provided are to illustrate the invention but are not intended to limit the scope thereof. All parts and percentages are by weight unless otherwise indicated.

EXAMPLE

Three duplicate 24"×24" (0.609 m) panels are prepared having outer layers of steel (0.0156" thickness, 0.40 mm) and an ABS (acrylonitrile/butadiene/styrene) resin (0.04", 1.0 mm) and a central layer of polyurethane foam (2.126", 54 mm). The panel is placed horizontally, steel side down into a steel frame which secures the panel by its edges along three sides. Strips of polyurethane foam are placed on the steel frame to insulate the frame from the panel during testing. A micrometer is positioned on the bottom of the panel at the center to measure distortion. Thermocouples are placed on each panel to measure the temperature of the steel layer, and the ABS layer. Each assembly is placed in an oven at about 68° C. until the temperature readings are essentially identical.

The first panel, still in its frame, is removed from the oven and is permitted to cool naturally in a room which is maintained at a temperature of about 20° to 23° C. The rate of cooling of the ABS and steel layers, and the distortion of the panel are as indicated in Table I.

TABLE I

Rate of Cooling of First Panel (Natural Cool-Down)*

| Time[1] (sec) | ABS temperature | Steel Temp. | distortion, in (mm) | |
|---|---|---|---|---|
| 0 | 67 | 67 | 0 | 0 |
| 120 | 59 | 49 | 0.037 | (0.94) |
| 240 | 52 | 43 | 0.06 | (1.52) |
| 360 | 47 | 40 | 0.075 | (1.91) |
| 480 | 45 | 37 | 0.078 | (1.98) |
| 600 | 42 | 35 | 0.088 | (2.24) |
| 900 | 33 | 31 | 0.131 | (3.33) |
| 1200 | 28 | 28 | 0.141 | (3.58) |
| 1500 | 27 | 27 | 0.147 | (3.73) |
| 3000 | 24 | 24 | 0.148 | (3.76) |
| ∞ | 20 | 20 | 0.148 | (3.76) |

Ave. rate of cooling (67–40° C.) —0.038° C./sec.
*Not an example of this invention.
[1]Measured from the time the panel is removed from the oven.

The second panel is removed from the oven and the ABS layer is immediately covered with a 2" thick polyurethane insulating foam. The rate of cooling of the ABS and steel layers, and the bowing of the panel is reported in Table II.

TABLE II

Rate of Cooling of Second Panel (ABS side insulated)

| Time[1] (sec) | ABS temperature | Steel Temp. | distortion, in (mm) | |
|---|---|---|---|---|
| 0 | 67 | 68 | 0 | (0) |
| 600 | 62 | 40 | 0.001 | (0.025) |
| 1200 | 61 | 34 | 0.012 | (0.051) |
| 1800 | 59 | 29 | 0.005 | (0.13) |
| 2400 | 57 | 29 | 0.010 | (0.25) |
| 3000 | 51 | 29 | 0.016 | (0.41) |
| 5000 | 38 | 25 | 0.039 | (0.99) |
| 12000 | 28 | 22 | 0.07 | (1.78) |
| ∞ | 22 | 22 | 0.086 | (2.18) |

Ave. rate of cooling (68° C.–40° C.) = 0.007° C./sec.
[1]Measured from the time the panel is removed from the oven.

The third panel is cooled in the same manner as the second except that the cooling of the steel side is accelerated by applying a fan thereto until its temperature reaches a constant value of about 20° C. The cooling of the ABS and the steel side, and the distortion of the panel are as reported in Table III.

TABLE III

Rate of Cooling of Third Panel (ABS side insulated, fan on steel side)

| Time[1] (sec) | ABS temperature | Steel Temp. | distortion, in (mm) | |
|---|---|---|---|---|
| 0 | 68 | 67 | 0 | (0) |
| 600 | 66 | 22 | 0 | (0) |
| 1200 | 61 | 20 | 0.015 | (0.38) |
| 1800 | 56 | 20 | 0.03 | (0.76) |
| 2400 | 51 | 20 | 0.043 | (1.08) |
| 3000 | 47 | 20 | 0.043 | (1.09) |
| 4800 | 38 | 20 | 0.07 | (1.78) |
| ∞ | 20 | 20 | 0.078 | (1.98) |

Ave. rate of cooling (68° C.–40° C.) = .0067° C./sec.
[1]Measured from the time the panel is removed from the oven.

Comparing the distortion of the first and second panels, it is seen that the retarded cooling of the ABS layer reduces the ultimate distortion of the panel by 42%. With accelerated cooling of the steel layer, the distortion of the panel is reduced even more, by 47%.

What is claimed is:

1. In a process for preparing a multilayer composite structure whereby the structure is produced at an elevated temperature, wherein the structure
   (i) tends to distort upon changes in temperature,
   (ii) comprises at least two layers of different materials, at least one of which creeps at the elevated temperature at which the structure is prepared, and
   (iii) contains no layers which creep significantly at ambient temperature,
the improvement which comprises cooling said structure such that at least one of the layer(s) which creeps at said elevated temperature is cooled to a temperature at which it does not significantly creep at a rate which is at least 50% less than the natural cooling rate thereof, and while the rate of cooling of at least one other layer in said composite, which layer has a greater coefficient of expansion and a higher elastic modulus than the layer(s) whose rate of cooling is retarded, is accelerated with respect to its natural cooling rate, thereby reducing or eliminating distortion in the cooled structure.

2. The process of claim 1 wherein the layer(s) which creep at the elevated temperature comprises a metal or a thermoplastic resin.

3. The process of claim 2 wherein said layer(s) which creep at said elevated temperature layer comprises a thermoplastic resin and said composite contains at least one other layer which comprises a metal or a thermoplastic resin.

4. The process of claim 3 wherein said rate of cooling of said layer(s) which creeps at said elevated temperature is at least 70% less than the natural cooling rate thereof.

5. The process of claim 4 wherein said composite structure comprises outer layers of a metal and a thermoplastic resin and an inner layer of a polyurethane foam.

6. In a process for preparing a composite article wherein said composite is prepared by providing a first layer of a thermoplastic material or metal and a second layer of a thermoplastic such that said first and second layers enclose a space, placing a reactive polymer-forming mixture in said space, and causing said polymer-forming mixture to react to form a foam which fills said space, wherein the heat of reaction of said polymer-forming mixture heats said first and second layers to an elevated temperature of about 50° to about 80° C., the improvement which comprises cooling said article such that said second layer which creeps at said elevated temperature is cooled to a temperature at which it does not significantly creep at a rate which is at least 50% less than the natural cooling rate thereof, and while the rate of cooling of the first layer, which layer has a greater coefficient of expansion and a higher elastic modulus than the second layer, is accelerated with respect to its natural cooling rate, thereby reducing or eliminating distortion in the cooled structure.

7. The process of claim 6 wherein said article is a refrigerator, cooler, freezer or ice chest.

8. The process of claim 7 wherein said foam is a polyurethane foam, and said first layer is a metal layer.

9. The process of claim 8 wherein the cooling of said second layer is cooled at a rate which is at least 75% less than the natural cooling rate thereof.

* * * * *